United States Patent [19]

Sato

[11] Patent Number: 5,321,690
[45] Date of Patent: Jun. 14, 1994

[54] TRANSMITTING AND RECEIVING SYSTEM IN BASE STATION

[75] Inventor: Toshifumi Sato, Tokyo, Japan

[73] Assignee: NEC Corporation, Tokyo, Japan

[21] Appl. No.: 31,477

[22] Filed: Mar. 15, 1993

[30] Foreign Application Priority Data

Mar. 13, 1992 [JP] Japan .................. 4-055545

[51] Int. Cl.$^5$ .............................................. H04J 3/02
[52] U.S. Cl. ...................................... 370/24; 370/95.3; 455/56.1
[58] Field of Search ............... 455/54.1, 56.1; 379/63; 370/24, 29, 36, 37, 38, 50, 95.1, 95.3

[56] References Cited

U.S. PATENT DOCUMENTS

5,117,423  5/1992  Shepherd et al. .............. 370/29
5,170,395 12/1992  Shinmyo ....................... 370/95.3
5,212,804  5/1993  Choate .......................... 455/56.1

Primary Examiner—Benedict V. Safourek
Attorney, Agent, or Firm—Sughrue, Mion, Zinn, Macpeak & Seas

[57] ABSTRACT

A transmitting and receiving system in base station in a time-division multiple access digital mobile telephone system has a control signal input/output unit (20) for an external system, a speech signal input/output unit (30) for the external system, a plurality of transmitting-/receiving units (10a, 10b, 10c) each including a radio transmitting/receiving circuit (11a, 11b, 11c) and a transmission/reception data processing circuit (12a, 12b, 12c), a control signal bus (40) connecting the control signal input/output unit and the plurality of transmitting/receiving units, and a speech signal bus (50) connecting the speech signal input/output unit and the plurality of transmitting/receiving units. The transmission/reception data processing circuit (12) executes processes of disassembling and assembling to and from a plurality of slots with respect to the control signals for all channels to be multiplexed to a single radio frequency, and of data processings for each slot on the control signals and the speech signals for all channels to be multiplexed to a single radio frequency.

5 Claims, 9 Drawing Sheets

(1) UP-GOING

1ST UNIT

| R 4 | P 48 | CAC 66 | SW 20 | CC 8 | CAC 116 | C 18 |
|---|---|---|---|---|---|---|

SUBSEQUENT 2ND UNIT

| R 4 | P 2 | CAC 112 | SW 20 | CC 8 | CAC 116 | C 18 |
|---|---|---|---|---|---|---|

(2) DOWN-COMING

| R 4 | P 2 | CAC 112 | SW 20 | CC 8 | CAC 112 | E 22 |
|---|---|---|---|---|---|---|

FIG. 6

(1) UP-GOING

| R | P | TCH<br>(FACCH) | SW | CC | SF | SACCH<br>(RCH) | TCH<br>(FACCH) | G |
|---|---|---|---|---|---|---|---|---|
| 4 | 2 | 112 | 20 | 8 | 1 | 15 | 112 | 6 |

(2) DOWN-COMING

| R | P | TCH<br>(FACCH) | SW | CC | SF | SACCH<br>(RCH) | TCH<br>(FACCH) |
|---|---|---|---|---|---|---|---|
| 4 | 2 | 112 | 20 | 8 | 1 | 21 | 112 |

FIG. 7

(EXAMPLE) IN THE CASE OF 1ST UNIT OF UP-GOING

FIG. 8

TRANSMITTING AND RECEIVING SYSTEM IN BASE STATION

BACKGROUND OF THE INVENTION

The present invention relates to a transmitting and receiving system in base station for a digital mobile telephone system adopting a time division multiple access system (TDMA) and, more particularly, to a transmission/reception data processing circuit, which permits ready transition from a full to a half rate system without alteration of any hardware but with mere simple alteration of firmware.

By the term "half rate system" is meant a mobile telephone system for speech communication at one half the information transmission rate of the full rate system. According to this half rate system about double capacity of the speech communication is permitted for the full rate system. By way of example, in the Japanese standard digital mobile telephone system, one frame is 40 milliseconds and is divided in time into 6 slots. In the full rate system, two slots in one frame are used for communication, while in the half rate system a single slot in the frame is used for communication.

Figure 3:
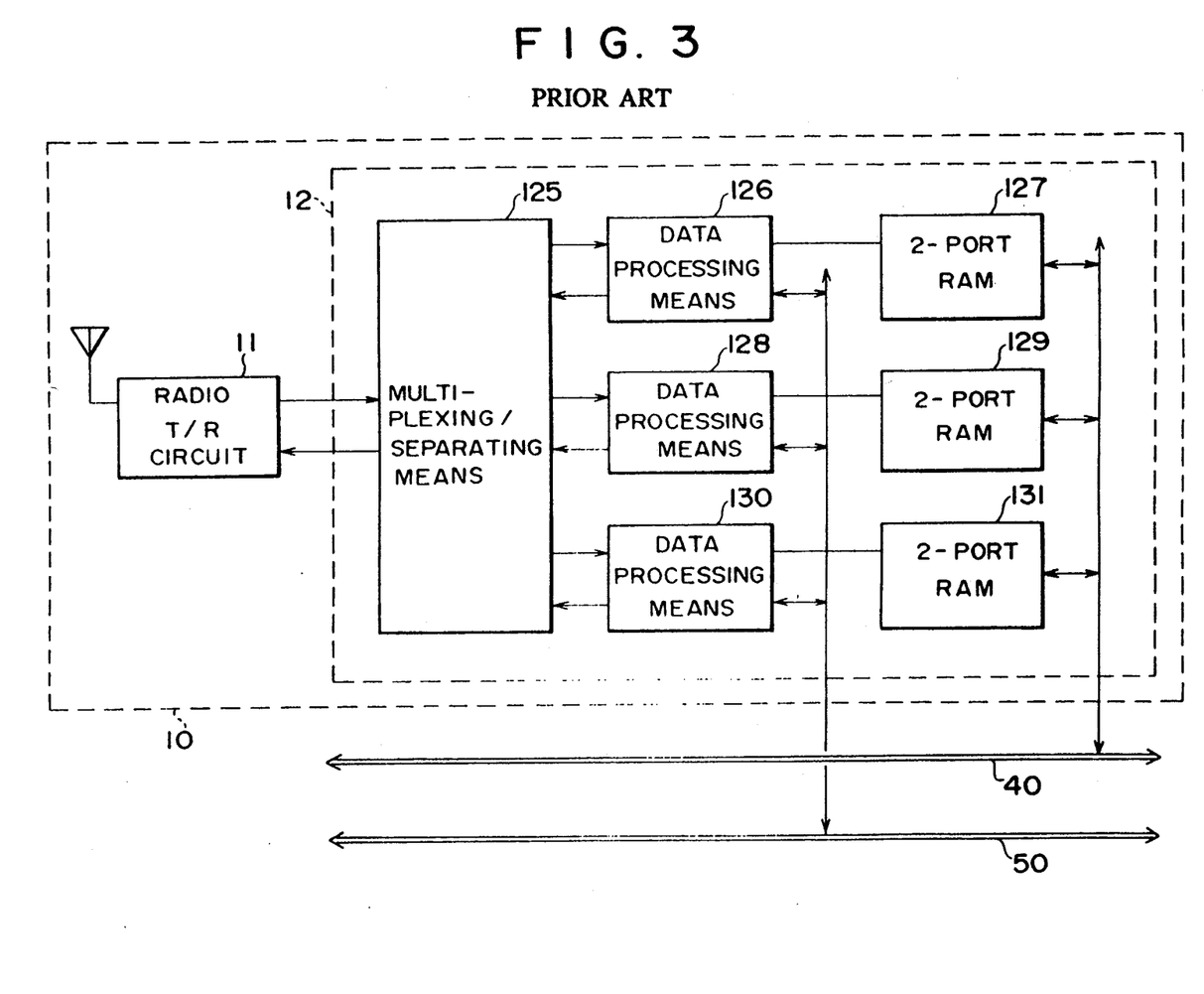
FIG. 3 is a block diagram showing a prior art transmission/reception data processing circuit.

FIG. 3 shows a prior art time division multiple access system transmission/reception data processing circuit of this type. As shown, the circuit has independent data processing means 126, 128 and 130 and 2-port RAMs 127, 129 and 131 for individual channels and also has multiplexing/separating means 125 for multiplexing and separating data of individual channels, the means 125 being provided between the data processing means 126, 128 and 130 and a radio transmitting/receiving circuit 11.

Such a prior art circuit should have a transmission/reception data processing unit and a 2-port RAM for each channel. When the number of channels to be multiplexed is changed such as in the case of transition from the full rate system to the half rate system, an expensive change of hardware is necessary.

For example, the Japanese standard digital mobile telephone system calls for the full rate system of 3-channel multiplexing to be placed in practical use first and the half rate system of 6-channel multiplexing to be introduced about two years later. According to the full and half rate systems coexist at a single radio frequency. Therefore, if processing units which can accommodate only the 3 channels necessary for the initial full rate system are provided in the prior art structure which requires a data processing unit for each channel, it becomes necessary to replace the transmission/reception data processing units at the time of the future introduction of the half rate system. On the other hand, providing data processing units for 6 channels to accommodate the half rate system from the outset causes a great initial investment.

In the half rate system, the bit rate is one half the bit rate in the full rate system so that about one half the transmission/reception data processing capacity suffices. Therefore, to be compatible with both the half and full rate systems it is necessary to have data processing units having the full rate system processing capacity for about 6 channels, which is also expensive.

SUMMARY OF THE INVENTION

An object of the invention is therefore to provide a transmitting and receiving system in base station capable of permitting the transition from a full rate system to a half rate system to be readily realized without hardware alteration but with a simple alteration of firmware.

In the preferred aspect of the present invention, the transmission/reception data processing circuit executes processes of disassembling and assembling to and from a plurality of slots with respect to control signals for all channels to be multiplexed to a single radio frequency, and of data processing for each slot on control signals for all channels to be multiplexed to a single radio frequency, and also executes data processing for each slot on speech signals of all channels to be multiplexed to a single radio frequency. It is thus possible to readily realize the transition from the full rate system to the half rate system without hardware alteration but with a mere simple firmware alteration.

Other objects and features will be clarified from the following description with reference to attached drawings.

DETAILED DESCRIPTION OF PREFERRED EMBODIMENTS

Figure 2:
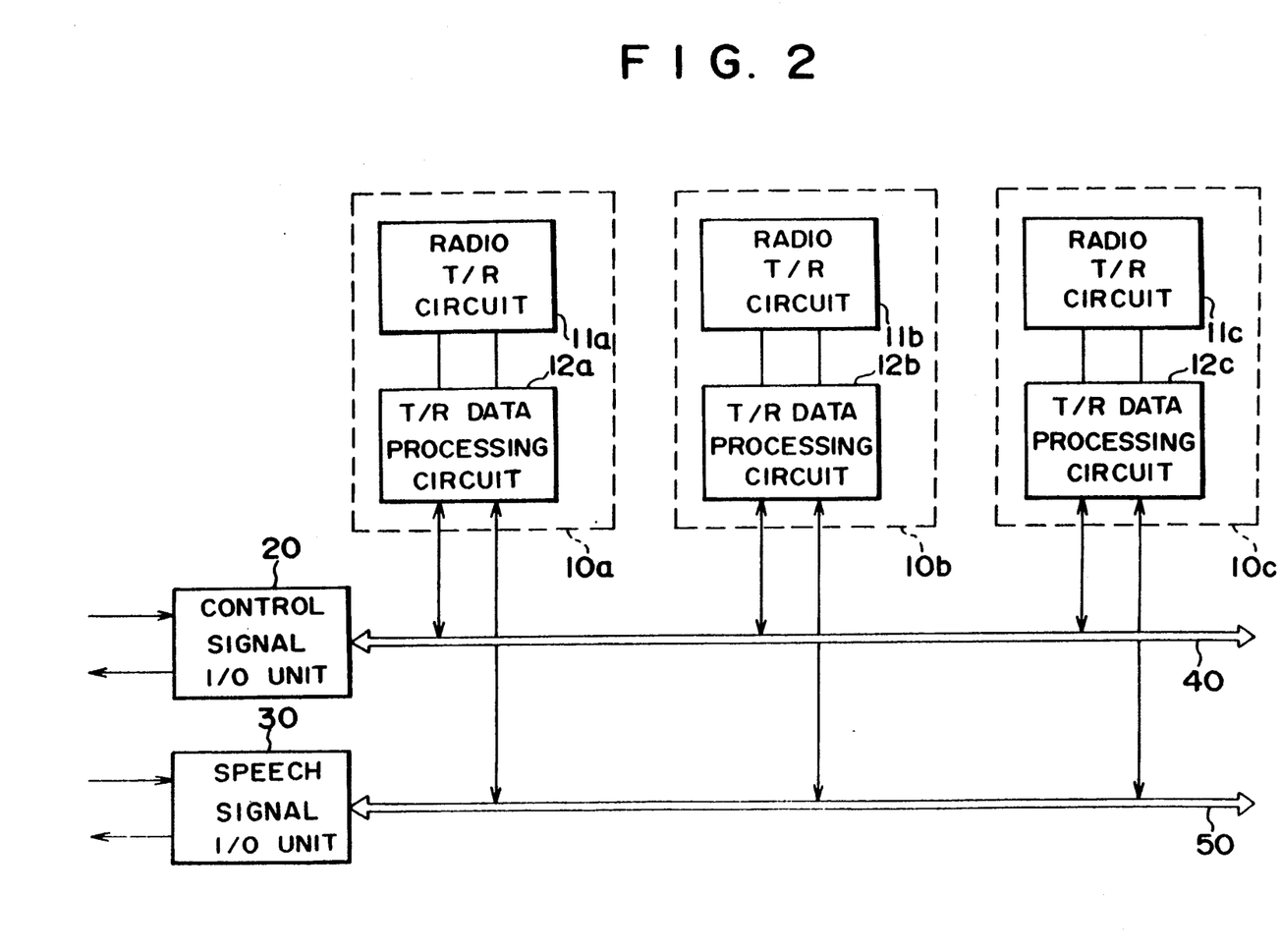
FIG. 2 is a block diagram showing an embodiment of the transmitting and receiving system in base station according to the present invention.

An embodiment of the present invention will now be described with reference to the drawings. FIG. 2 is a block diagram showing the transmitting and receiving system in a base station in a digital mobile telephone system utilizing a time division multiple access system according to the invention.

The transmitting and receiving system in the base station comprises a control signal input/output unit 20 for inputting and outputting control signals from and to the external system, a speech signal input/output unit 30 for inputting and outputting speech signals from and to the external system, a plurality of transmitting/receiving units 10a to 10c including respective radio transmitting/receiving circuits 11a to 11c and transmission/reception data processing circuits 12a to 12c, a control signal bus 40 connecting the control signal input/output unit 20 and the transmitting/receiving units 10a to 10c, and a speech signal bus 50 connecting the speech signal input/output unit 30 and the transmitting/receiving units 10a to 10c. The control signal input/output unit 20 communicates with the external system in accordance with CCITT X. 25 protocol for data transmission between the external system and each of the transmitting/receiving units 10a to 10c. The speech signal input- /output unit 30 has functions to serve as an interface for the external system, of, for instance, 2,048 kbps MD codes and TTL level signal in the speech signal bus 50 and also to extract and add 8 kHz synchronous signal. The transmitting/receiving units 10a to 10c transmit and receive the control or speech signals to and from the mobile telephone sets using radio frequency signals. The transmitting/receiving units 10a to 10c comprise respective radio transmitting/receiving circuits 11a to 11c and transmission/reception data processing circuits 12a to 12c. The radio transmitting/receiving circuits 11a to 11c transmit and receive triplexed or hexaplexed 42 kbps data to and from the mobile telephone sets by using radio frequency signals based upon a $\pi/4$ shift QPSK system. The transmission/reception data processing circuits 12a to 12c execute processings of layers 1 and 2 process for the control signal, scrambling process for the speech signal, etc. in each of the multiplexed channels.

Figure 1:
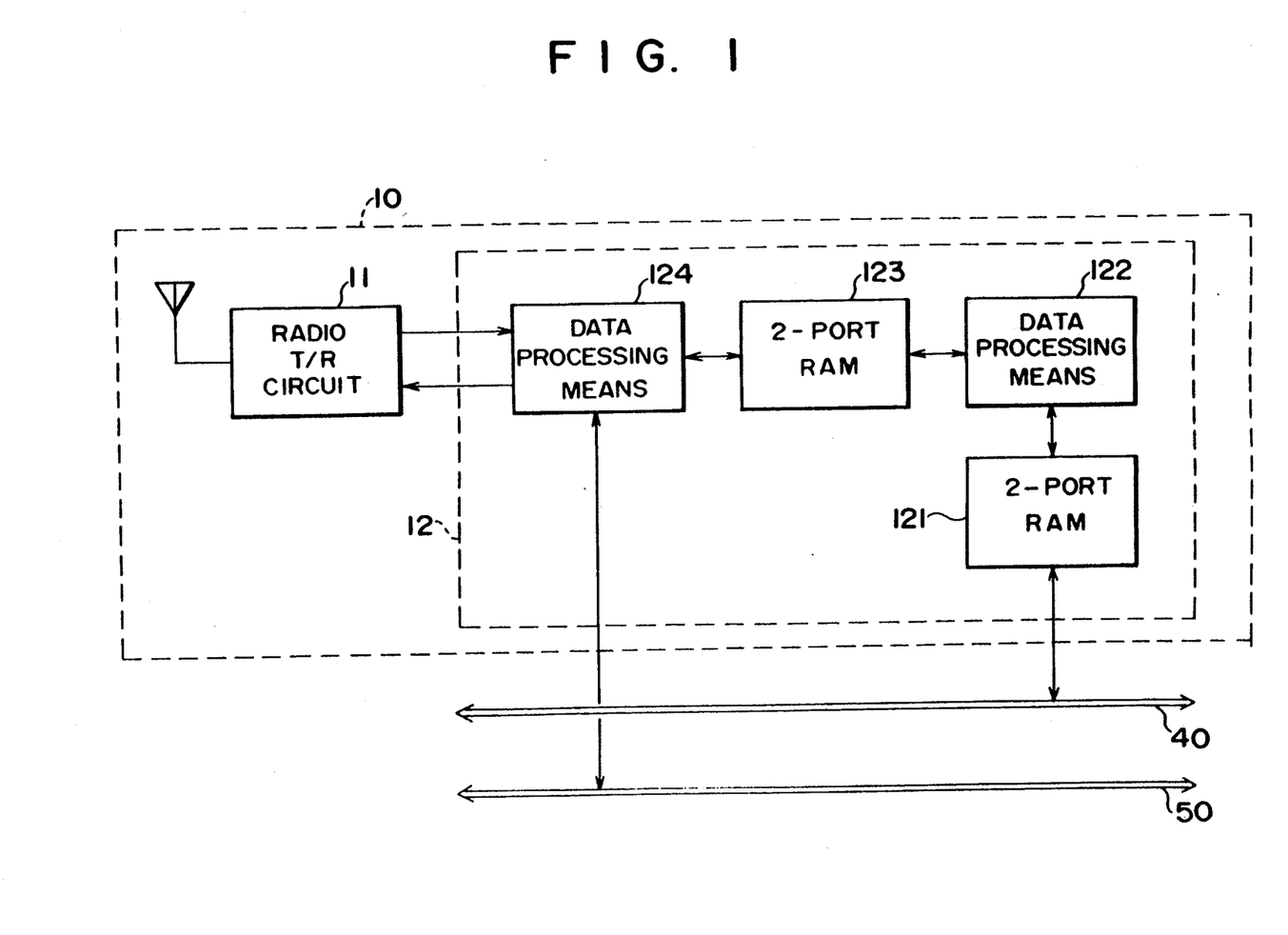
FIG. 1 is a block diagram showing a transmission/reception data processing circuit according to an embodiment of the present invention.

FIG. 1 is a block diagram showing the transmitting-/receiving unit according to this embodiment. The transmitting/receiving unit 10 includes the radio transmitting/receiving circuit 11 and the transmission/-reception data processing circuit 12. The transmission/-reception data processing circuit 12 includes a first 2-port RAM 121, first data processing means 122, a second 2-port RAM 123 and second data processing means 124. The first 2-port RAM 121 and the second data processing means 124 are connected to the control and speech signal buses 40 and 50, respectively. The first data processing means 122 may be realized with MPU peripheral circuits of a universal microprocessors (hereinafter referred to as MPU), such as memories, address decoders and timers. The second data processing means 124 may be realized with, for instance, a high rate single chip MPU or a single chip digital signal processor (hereinafter referred to as DSP). The first 2-port RAM 121 has a plurality of control signal buffers for the rate matching of the control signal input/output unit, and its capacity is several 10 kB. The second 2-port RAM 123 has a buffer for one slot for each channel, and thus its capacity is several 100 B to several kB.

More specifically, the embodiment, as shown in FIGS. 1 and 2, comprises a control signal input/output unit 20 for inputting and outputting control signals from and to the external system, a speech signal input/output unit 30 for inputting and outputting speech signals from and to the external system, a plurality of transmitting-/receiving units 10a to 10c each including radio transmitting/receiving circuit 11 and a transmission/reception data processing circuit 12, a control signal bus 40 connecting the control signal input/output unit 20 and the plurality of the transmitting/receiving units 10a to 10c, and a speech signal bus 50 connecting the speech signal input/output unit 30 and the plurality of the transmitting/receiving units 10a to 10c. The transmission/reception data processing circuit 12 as featuring means of the embodiment, comprises first data processing means 122 for disassembling and assembling into and from a plurality of slots with respect to control signals for all channels to be multiplexed to a single radio frequency, a first 2-port RAM 121 connected to the first data processing means 122 and also to the control signal bus 40, second data processing means 124 for executing data processing for each slot on the control signals for all channels to be multiplexed to a signal radio frequency and also executing data processing for each slot on the speech signals for all channels to be multiplexed to a single ratio frequency, and a second 2-port RAM 123 connected to the first data processing means 122 and also to the second data processing means 124.

Now, signal formats and contents of the data processing will be described by taking the Japanese standard digital mobile telephone system as an example. The standards of the Japanese standard digital mobile telephone system are published as RCR STD-27 by the Research & Development Center for Radio Systems.

Figure 4:
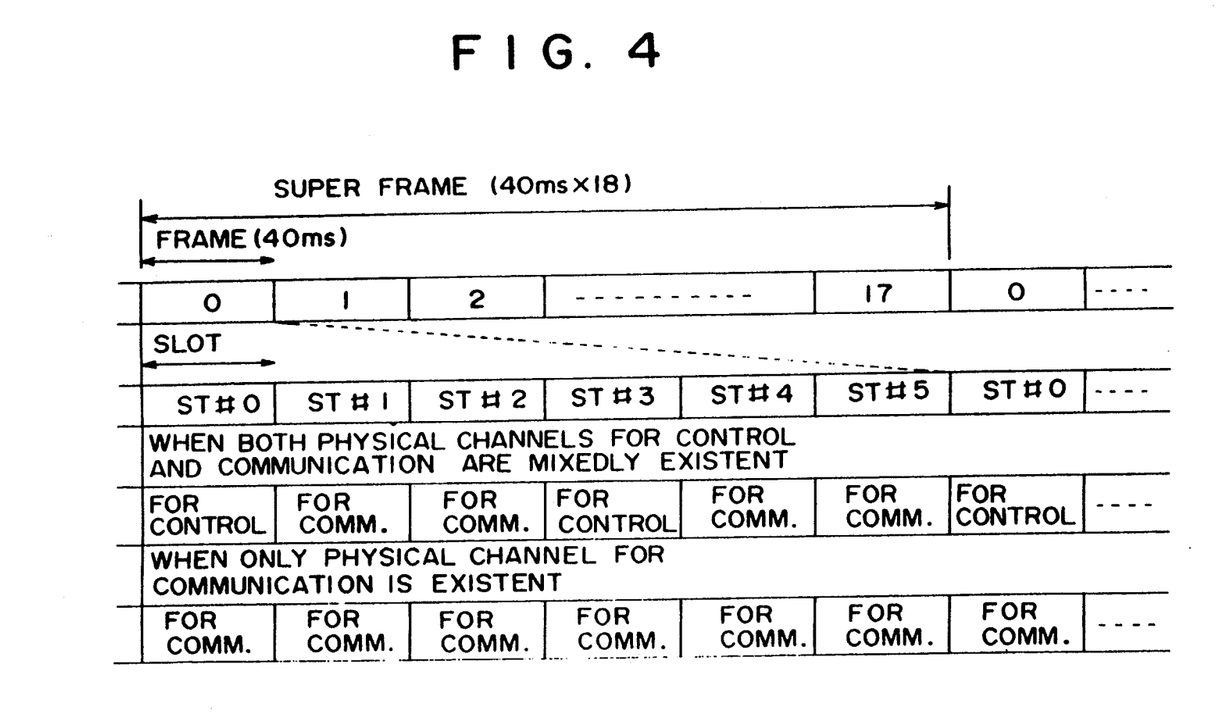
FIG. 4 is a time chart showing a frame configuration of a TDMA signal.

FIG. 4 shows the format of a time divisional multiplexed signal transmitted as a radio signal. In FIG. 4, labeled ST#0 to ST#5 are slot Nos. in the frame. 1 superframe comprises 18 frames each comprising six slots. Each slot can be assigned as an independent channel (physical channel). In the case of a physical channel for control (control physical channel) or a physical channel for communication (communication physical channel) for the full rate system, however, two slots in one frame are used. That is, channels ST#0 and ST#3, ST#1 and ST#4, or ST#2 and ST#5 are assigned to the single physical channel. For the physical channel for the half rate communication physical channel, a slot in one frame is used. Thus, three to six physical channels are multiplexed per radio frequency.

Figure 5:
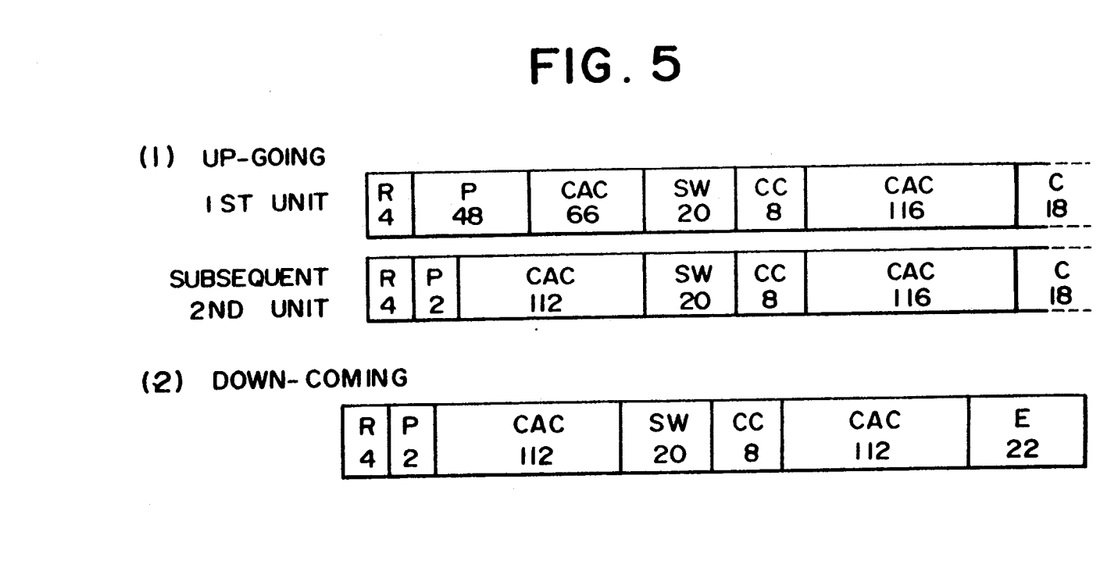
FIG. 5 is a time chart showing the signal format of one unit of a physical channel for control.
Figure 6:
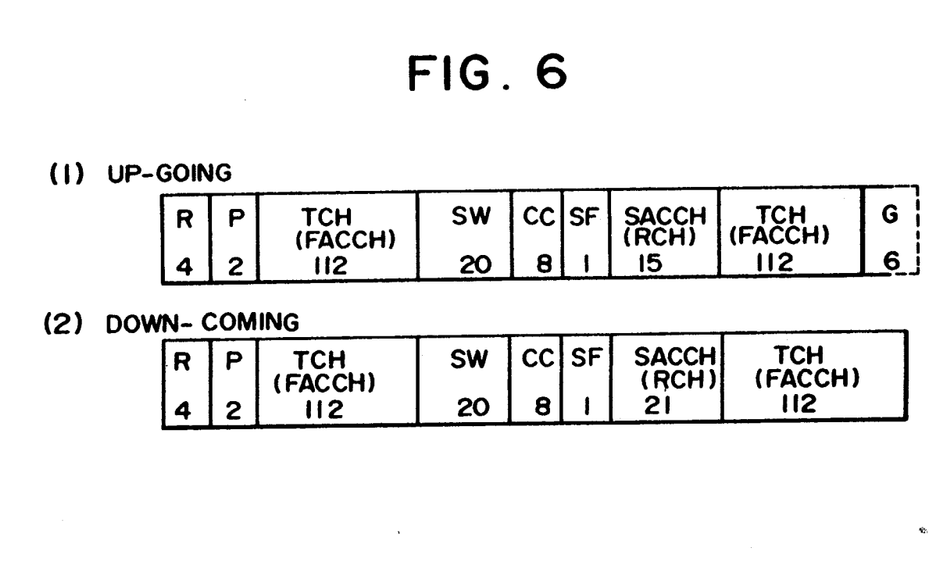
FIG. 6 is a time chart showing the signal format of one unit of a physical channel for communication.

FIGS. 5 and 6 show signal formats in one slot of the control and communication physical channels. In FIG. 5, labeled G is a guard time, R guard times for the burst transient response, P preambles, SW synchronous word, CC color codes, CAC control signals (PCH, BCCH, SCCH), and E collision control bit. In FIG. 6, labeled G is a guard time, R guard times for burst transient response, P preambles, SW synchronous words, CC color codes, SACCH control channels covering low rates, FACCH control channels covering high rate, RCH a housekeeping bit, SF a steal flag, and TCH speech signals. A one slot signal is obtained by adding the preamble P, the synchronous word SW, the color code CC, etc. to the speech signal.

Figure 7:
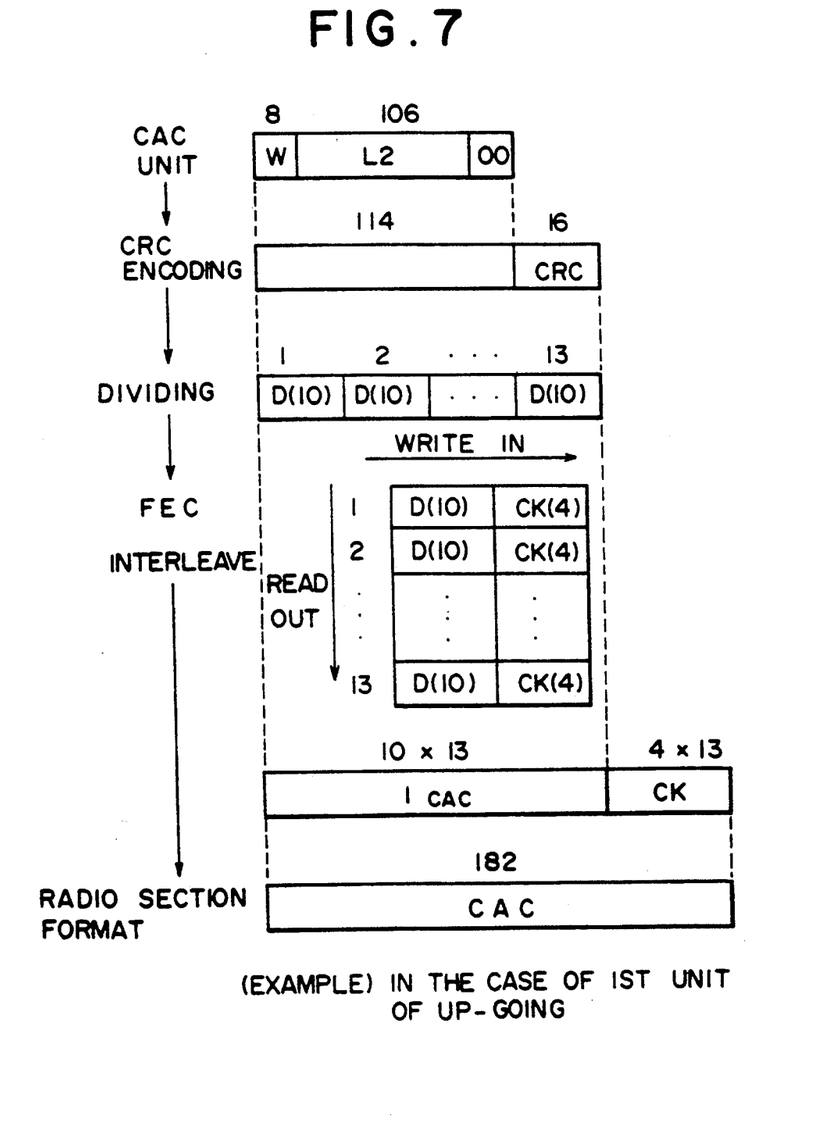
FIG. 7 is a view showing data processing for an upgoing first unit of a physical channel for control.
Figure 8:
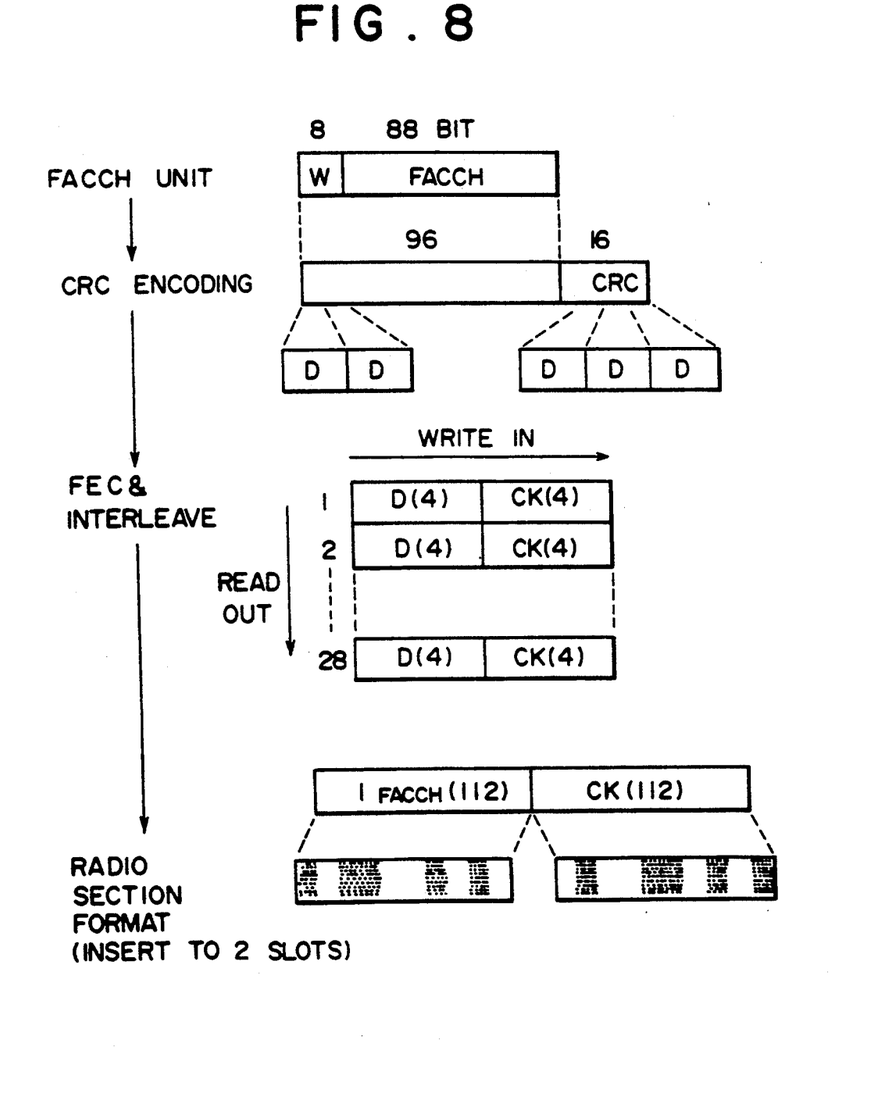
FIG. 8 is a view showing data processing for FACCH of a physical channel for communication.

FIGS. 7 and 8 show the flow of one unit signal data processing for control and high rate coverage control channel as respective examples. In FIG. 7, labeled W is a bit for signal disassembling and assembling, and 00 "Don't care". The high rate coverage channel is a communication physical channel. If it is desired to transmit a control signal at high rate during a communication session, it is transmitted and received in place of the speech signal data. In the transmission of one unit control signal, CRC encoding, error correction (FEC) and interleaving are executed. In the reception, converse to the transmission, de-interleaving, error correction decoding and CRC check are executed.

Figure 9:
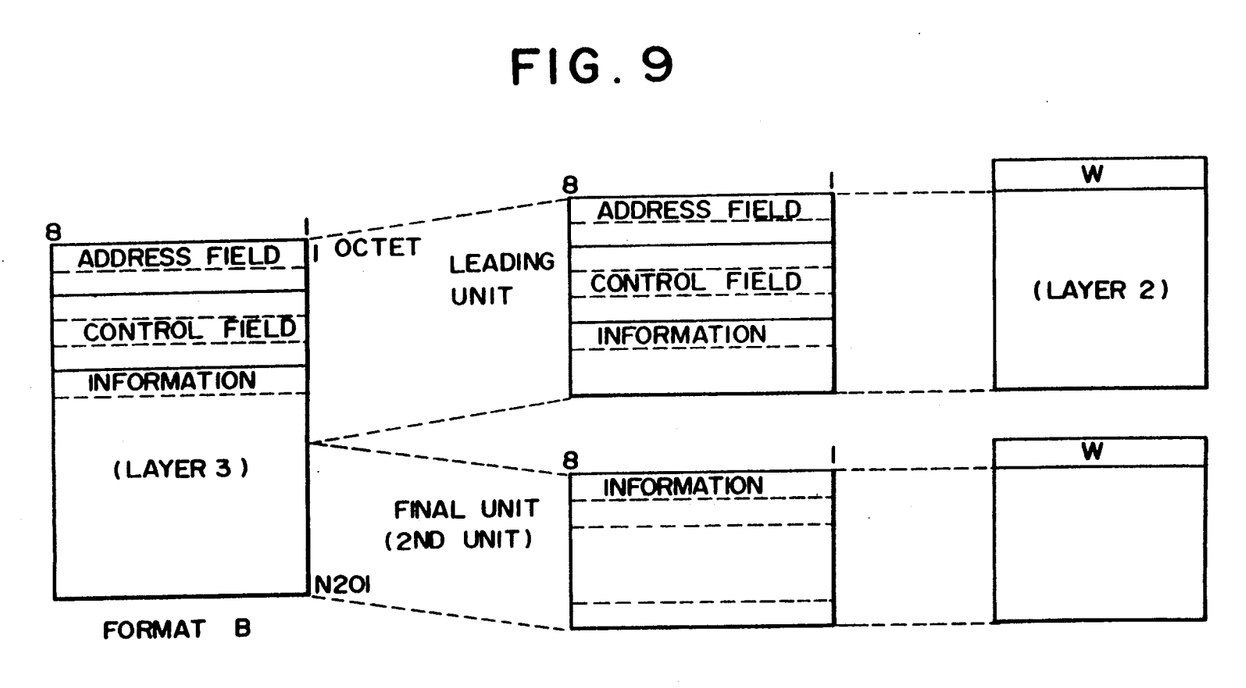
FIG. 9 is a view showing disassembling and assembling for plural units for a control signal.

FIG.9 shows an example of disassembling and assembling when the control signal is transmitted with a plurality of units. In FIG. 9, labeled W is a bit for signal disassembling and assembling. In the control signal, the bit for signal disassembling and assembling is added to the head after its division to a length of an octet number capable of being transmitted by one unit.

Now, the operation of the transmission/reception data processing circuit according to the embodiment will be described. When a down-coming control signal is transmitted from the external system, the control signal (layer 3 information) is written in the first 2-port RAM 121 via the control signal input/output unit 20 and the control signal bus 40. The first data processing means 122 adds a layer 2 address field and a control field to the layer 3 information. In the case of an octet number which can not be transmitted by one unit, a bit of signal disassembling and assembling is added after the division into a plurality of units, and the added signal is written in the second 2-port RAM 123. When the data in the second 2-port RAM 123 is not yet taken by the second data processing means 124, the data is written successively unit by unit in the second 2-port RAM 123 after taking. When a control signal is written in the second 2-port RAM 123, the second data processing means 124 executes CRC coding, FEC coding and interleaving as has been described in connection with FIGS. 7 and 8, adds a preamble, a synchronous signal, a color code, etc. to form the down-coming formats shown in FIGS. 5(2) and 6(2), and transmits the resultant data in an assigned slot as shown in FIG. 4. When data to be transmitted is not written in the second 2-port RAM 123, the second data processing means 124 produces idle data. However, the high rate coverage control channel is excluded. When a slot is assigned to a physical channel for communication, the second data processing means 124 executes scrambling and a secret processing on the speech signal input from the external system via the speech signal input/output unit 30 and the speech signal bus 50 and transmits the resultant data as the speech signal.

With an up-going control signal, the second data processing means 124 takes out a control signal portion and executes de-interleaving, FEC coding and CRC check as shown in FIGS. 7 and 8. If no error is detected by the CRC check, it is determined that the data is received, and the reception control signal (signal disassembling and assembling bit, layer 2 signal) in one unit is written in the second 2-port RAM 123. If a reception slot is assigned to a physical channel for communication, the speech signal portion is taken out, and then scrambling and secret processing are executed on the taken out speech signal. The resultant data is outputted to the speech signal bus 50. The speech signal is supplied to the external system via the speech signal bus 50 and the speech signal input/output unit 30.

The second data processing means 124 reads out the data from the second 2-port RAM 123. If there is received data in the read out data, it assembles layer 2 information having been divided into a plurality of units by using the bit of signal disassembling and assembling, as shown in FIG. 9. If the received control signal includes layer 3 information, it is written in the first 2-port RAM 121. The control signal is outputted to the external system via the control signal bus 40 and the control signal input/output unit 20.

The first data processing means 122 is operative only when a control signal is transmitted, and thus it need not be capable of high rate processing. Since a plurality of control signals are buffered, it is thus adequately realized with a universal microprocessor of 16 to 32 bits. The second data processing means 124 has to execute processing irrespective of whether or not there is a control signal, and thus it is required to be capable of high rate processing. However, it executes only unit processing, and no large capacity memory is needed. It is thus adequate to realize it with a high rate chip MPU or DSP. Of course, it can be realized with exclusive hardware because of frequent repetition of a simple process.

Since the data processing means 122 and 124 may comprise a MPU or DSP, it is possible to accommodate the system with the alteration of the firmware (program) for increase from three to six data processing means and 2-port RAMS are necessary, that is, the multiplexing/separating means has to be altered from the triplex to the hexaplex.

As has been described in the foregoing, according to the invention it is possible to permit ready transition from the full to the half rate system without hardware alteration but with a mere simple alteration of the firmware. It is thus possible to minimize the investment at the time of the transition of the system.

What is claimed is:

1. A transmitting and receiving system in a base station in a time division multiple access digital mobile telephone system comprising: a control signal input/output unit for inputting and outputting control signals from and to an external system, a speech signal input/output unit for inputting and outputting speech signals form and to an external system, a first plurality of transmitting/receiving units each including a radio transmitting/receiving circuit and a transmission/reception data processing circuit, said transmission/reception data processing circuit for processing time division multiplexed signals, each of said multiplexed signals being composed of a second plurality of frames, each of said frames being composed of a third plurality of slots, a control signal bus connecting said control signal input/output unit and said plurality of transmitting/receiving units, and a speech signal bus connecting said speech signal input/output unit and said plurality of transmitting/receiving units, wherein said transmission/reception data processing circuit includes:

a first data processing means for executing processes of assembling and disassembling to and from a fourth plurality of said slots by modifying said control signals received from said control signal input/output unit to form a fifth plurality of channels to be multiplexed to a single radio frequency;

a first 2-port RAM connected to said first data processing means and also to said control signal bus;

a second data processing means for executing a data processing on said control signals for each of said slots so that all channels are multiplexed to a single radio frequency; and a second 2-port RAM connected to both said first and second data processing means.

2. The transmitting and receiving system in a base station according to claim 1, wherein said first data processing means is a universal microprocessor, and said second data processing means is a high speed single-chip microprocessor.

3. A transmitting and receiving system in a base station in a time division multiple access digital mobile telephone system as set forth in claim 1, wherein in response to a down-coming control signal transmitted from said external system, the control signal is written in said first 2-port RAM by said control signal input/output unit and said control signal bus, said first data processing means adds an address field and a control field to the control signal, and in the case of an octet number which can not be transmitted by one unit, adds a bit of signal disassembling and assembling after the division into a plurality of units and writes the added signal into said second 2-port RAM, when the control signal has been written in said 2-port RAM, said second data processing means from a predetermined down-coming format, transmits the resultant data in an assigned slot, and executes scrambling and secret processings on the speech signal input from said external system.

4. A transmitting and receiving system in a base station in a time division multiple access digital mobile telephone system as set forth in claim 1, wherein in response to an up-going signal which includes a control signal having interleaving FEC coding and CRC check information and a speech signal, said second data processing means takes out the control signal portion and executes de-interleaving, FEC coding and CRC check on the taken out speech signal, when the reception slot is assigned to a physical channel for communication, takes out the speech signal portion, and executes scrambling and secret processings on the taken out speech signal.

5. A transmitting and receiving system in a base station in a time division multiple access digital mobile telephone system comprising: a control signal input/output unit for inputting and outputting control signals from and to an external system, a speech signal input/output unit for inputting and outputting a speech signal from and to the external system, a first plurality of transmitting/receiving units each including a radio transmitting/receiving circuit and a transmission/reception data processing circuit, said transmission/reception data processing circuit for processing time division multiplexed signals, each of said multiplexed signals being composed of a second plurality of frames, each of said frames being composed of third plurality of slots, a control signal bus connecting said control signal input/output unit and said first plurality of transmitting/receiving units, and a speech signal bus connecting said speech signal input/output unit and said first plurality of transmitting/receiving unite, wherein said transmission/reception data processing circuit executes processes of disassembling and assembling a fourth plurality of slots with respect to said control signals received from said control signal input/output to form a fifth plurality of channels so that said channels are multiplexed to a single radio frequency.

* * * * *

UNITED STATES PATENT AND TRADEMARK OFFICE
CERTIFICATE OF CORRECTION

PATENT NO. : 5,321,690
DATED : June 14, 1994
INVENTOR(S) : SATO

It is certified that error appears in the above-indentified patent and that said Letters Patent is hereby corrected as shown below:

Column 5, line 67, after "the" (first occurrence) insert --transition from the full rate--, after "system" insert --to the half rate system--;

line 68, after "for" insert --this part of the system, that is, no hardware alteration is necessary. In the prior art, as shown FIG. 3, on--.

Column 6, line 17, change "form" to --from--;
line 58, change "field-to" to --field to--.

Column 8, line 13, change "unite" to --units--.

Signed and Sealed this

Twenty-third Day of May, 1995

*Attest:*

BRUCE LEHMAN

*Attesting Officer*   Commissioner of Patents and Trademarks